Nov. 23, 1954

A. P. KRUEGER 2,695,057

MACHINE FOR DISPENSING TAPE

Filed Aug. 1, 1952

Inventor
Alfred P. Krueger
By
Rockwell & Bartholow
Attorneys

Nov. 23, 1954 A. P. KRUEGER 2,695,057
MACHINE FOR DISPENSING TAPE
Filed Aug. 1, 1952 2 Sheets-Sheet 2

Inventor.
Alfred P. Krueger
By
Rockwell & Bartholow
Attorneys

United States Patent Office 2,695,057
Patented Nov. 23, 1954

2,695,057

MACHINE FOR DISPENSING TAPE

Alfred P. Krueger, Stratford, Conn., assignor to Derby Sealers, Incorporated, Derby, Conn., a corporation of Connecticut Application August 1, 1952, Serial No. 302,145

18 Claims. (Cl. 164—39)

This application relates to tape-dispensing machines and more particularly to a machine for dispensing pressure-sensitive tape. Such tape is tacky or clingable upon one surface so that it will adhere to the surface of an article upon which it is pressed with a certain amount of pressure. On account of its tacky nature the serving or dispensing of tape of this kind has been attended with certain problems.

Prior machines of this type have been generally of two kinds. In one kind of such machines the tape is drawn from the supply roll manually by being engaged with the fingers and pulled from the roll. In the other type of machines for dispensing tape the tape is drawn from the supply roll by its adherence to a feeding device, the feeding device being moved for this purpose. In the present instance the feeding device is a feeding roll, and this roll is rotated to draw the tape from the machine. As indicated, this is a device of the second type above referred to in that it is adapted to draw the tape from the supply roll by movement of a lever or the like which is operated manually, the movement of the lever serving to rotate the feed roll to which the tape adheres.

In a dispensing mechanism of the type illustrated in the present application it is desirable that the movement of the lever by the operator not only serve to dispense a proper length of tape but also serve to sever the dispensed portion of the tape and support this severed portion with a portion or free end in extended position so that it may be readily grasped by the operator in a convenient manner to be applied to a package or other article.

In the present invention a device is provided which will dispense a given length of pressure-sensitive tape by drawing the tape from the supply roll, severing it, and delivering the severed portion to such a position that it may be readily grasped by the operator in a manner in which it may be conveniently applied to a package. Moreover, the length of tape which has been severed will be supported by the device only at its severed end, the remainder of the severed portion projecting from the machine whereby it may be freely grasped.

In the present device a feed roll is provided to draw the tape from the supply roll, and the tape is stripped from the feed roll before being severed. This is a departure from the operation performed by certain prior devices in which the tape is held by the feeding device during the severing operation.

Also in the present mechanism the feed roll is rotated during the feeding operation, but at the end of this operation this roll is restrained against rotation and moved bodily with respect to the severing member or knife so as to carry the tape over the edge of the knife in order to sever it. At the same time the tape is gripped upon both sides adjacent the knife so that it will be cleanly severed.

It may also be noted that the knife or severing blade is guarded so that there is no danger of its being contacted by the fingers of the operator. This guard member for the knife serves as one of the gripping members to grip the tape at one surface thereof and also serves as the tape-end-supporting member which supports the severed portion of the tape with its free end extending in position to be grasped by the operator.

One object of the invention is to provide a novel apparatus for dispensing pressure-sensitive tape.

A further object of the invention is to provide a device for dispensing pressure-sensitive tape such that a predetermined length of tape will be drawn from a supply roll, severed, and delivered in a position in which it projects from the machine, and hence may be readily grasped by the operator.

A still further object of the invention is to provide a device for dispensing pressure-sensitive tape, which device will draw a predetermined length of tape from a supply roll by forward movement of a lever or similar manually operated element, and by a continued movement of this element cut or sever the dispensed length of tape while discontinuing the rotation of the feed roll during the severing operation.

A still further object of the invention is the provision of a tape-feeding mechanism having a feed roll to draw a length of tape from a supply roll in which the feed roller is rotated during the feeding operation, and thereafter the rotation of the feeding roller is discontinued and this roller with the tape clinging thereto is moved bodily toward a severing member in order to present the tape to the severing member at a point adjacent the roller.

Still another object of the invention is to provide a tape-dispensing machine of the character described above in which provision is made for stripping the tape from the feeding roller so that it will project forwardly from the machine, and after the severing operation a freely extending end will be presented where it may be readily grasped by the operator.

To these and other ends the invention consists in the novel features and combinations of parts to be hereinafter described and claimed.

Figure 1:
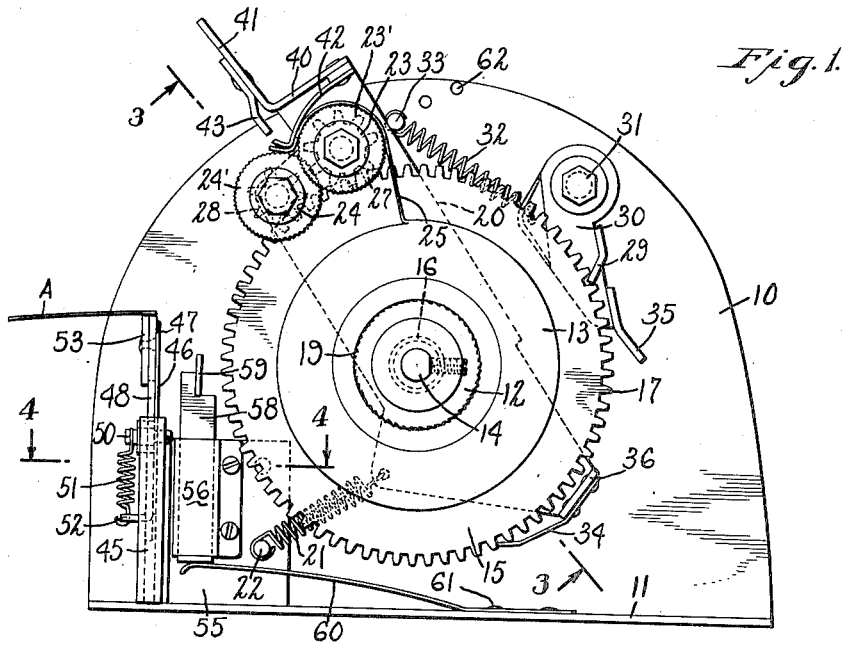
Fig. 1 is a side elevational view of a tape-dispensing mechanism embodying my invention.

To illustrate a preferred embodiment of my invention I have shown a tape-dispensing mechanism comprising a frame having an upstanding portion 10 and a horizontally disposed base portion 11. Upon the upstanding portion of the frame is rotatably mounted a hub or spool 12 for supporting a supply roll of tape 13, the hub being mounted upon a fixed spindle 14 secured to the frame member 10.

A gear 15 is rotatably mounted upon the spindle 14, the gear being secured to a sleeve 16 which in turn is rotatably carried by the spindle. As shown more particularly in Figs. 1, 5 and 6, this gear is provided with a continuous series of teeth 17.

The hub 12 may be provided upon its surface with helically formed serrations 19 so that the spool upon which the supply of tape 13 is carried will tend to work inwardly toward the frame 10 and not tend to work outwardly off the end of the hub. As will also be noted, the gear 15 is mounted between the hub 12 and the frame member 10. Also pivotally or rotatably mounted upon the spindle 14 is a lever or carrier member 20 which, as shown particularly in Figs. 1 and 5, extends upon both sides of the spindle 14 and is normally urged in a clockwise direction by a spring 21 secured at one end to the lever and secured at the other end to a pin 22 secured in the frame member 10.

Figure 5:
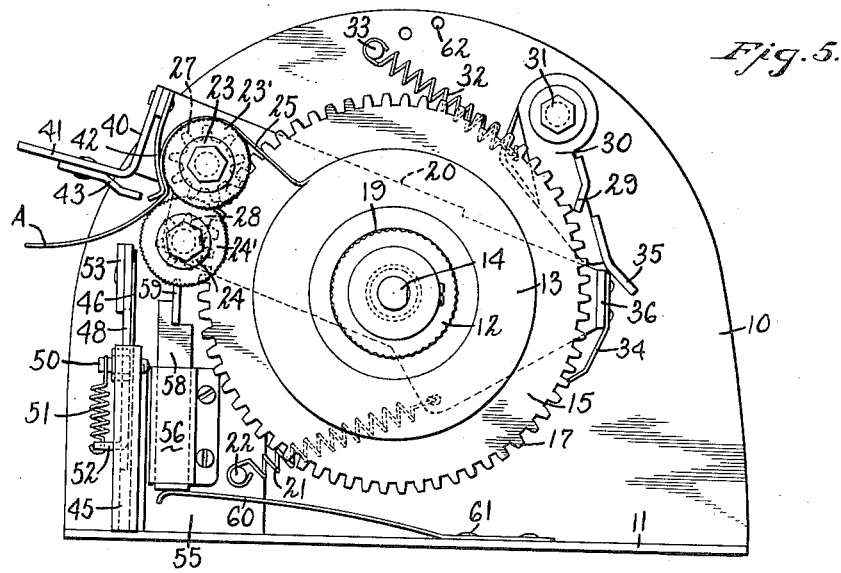
Fig. 5 is a view similar to Fig. 1 but showing the mechanism in the position occupied by the parts at the end of the feeding operation.
Figure 7:
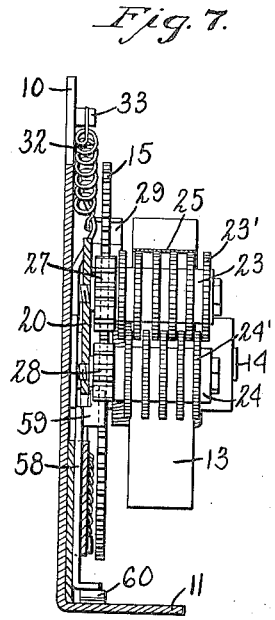
Fig. 7 is a sectional view on line 7—7 of Fig. 6.

Upon the upper end of this lever is rotatably mounted a feed roll 23 and a stripper roll 24. As shown more particularly in Fig. 7 each of these rolls is provided with a plurality of spaced feeding disks knurled on their peripheral edges, the disks 24′ of the stripper roll extending between the disks 23′ of the feed roll so as to strip the tape from the latter when the two rolls are rotated. As shown in Fig. 5 the tape designated at 25 extends from the supply roll 13 over the feed roll 23 where its tacky surface engages and adheres to the disks 23′.

A pinion 27 is secured to the shaft of the feed roll 23 and a similar pinion 28 although smaller in size is secured to the shaft of the stripper roll 24. The teeth of each of these pinions are in engagement with the teeth of the large fulcrum gear 15 so, as will be obvious, when the lever 20 is moved about its axis on the spindle 14, the pinions 27 and 28 will move over the teeth of the fulcrum gear 15 and the feed roll 23 and stripper roll 24 will be rotated. As the pinion 24 is of smaller size and has a smaller number of teeth than the pinion 23, it will be rotated at a faster surface speed which is desirable in order that the tape not only be stripped from the feed roll 23 but that the stripper roll 24 by its greater surface speed strips itself from the tape so as to leave a free end in extending position, as shown, for example, in Fig. 5.

The fulcrum gear 15 is normally held against rotation by the tooth 29 of a pawl member 30 pivoted at 31 to the frame member 10. This pawl member is normally urged toward the gear by a spring 32 secured at one end to the member 30 and at its other end to a pin 33 fixed in the frame.

Secured to the lower end of the lever 20 is a spring pawl member 34 which rides over the teeth of the gear pawl member 15 when the lever 20 is moved in a counter-clockwise or tape-feeding direction but which, when the lever 20 is moved in the opposite direction by the spring 21, serves to rotate the fulcrum gear 15 in a clockwise direction, this rotation, of course, being permitted by the pawl 29, which will permit the gear teeth to slide freely thereby in this direction. Upon the lower end of the pawl 30 is a lug 35 which, as shown in Fig. 5, is designed to be engaged by a laterally extending portion 36 on the lower end of the lever 20 so as to move the finger 29 out of engagement with the gear teeth 17 and permit the latter to rotate as will be hereinafter explained.

At the outer end of the lever 20 is an L-shaped member having a laterally extending portion 40 and an outwardly extending portion 41, the latter being adapted to be engaged by the fingers of the operator to draw the lever forwardly in a tape-feeding direction from the position shown in Fig. 1 to that shown in Fig. 5, for example. Secured to the inner surface of the member 40 is a tape-engaging member 42 which serves to engage the upper surface of the tape as it is stripped from the feed roll 23 and also engage the upper surface of the tape during the severing operation shown in Fig. 6. Secured to the forwardly extending portion 41 of the L-shaped member at the end of the lever 40 is a tape-engaging member 43 which also serves to engage the upper or non-tacky surface of the tape during a severing operation. It will be noted that the free ends of the members 42 and 43 are spaced apart so as to leave room for the knife or severing member to be hereinafter described to enter between them and sever the tape cleanly while the latter is held against movement on both sides of the knife by the edges of these members.

Figure 2:
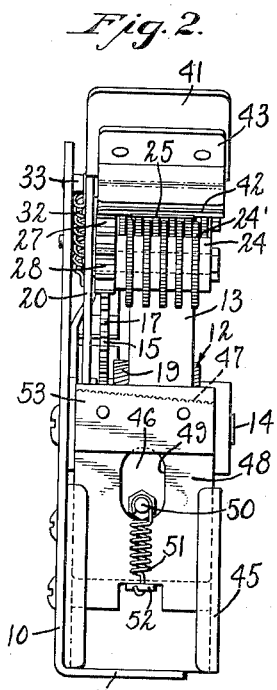
Fig. 2 is a front elevational view thereof.
Figure 3:
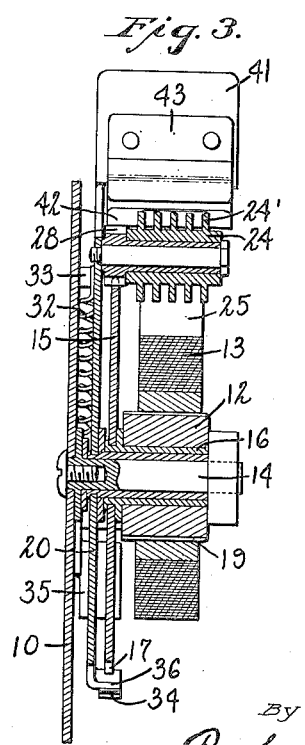
Fig. 3 is a sectional view on line 3—3 of Fig. 1.
Figure 4:
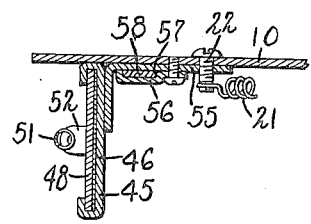
Fig. 4 is a sectional view on line 4—4 of Fig. 1.
Figure 6:
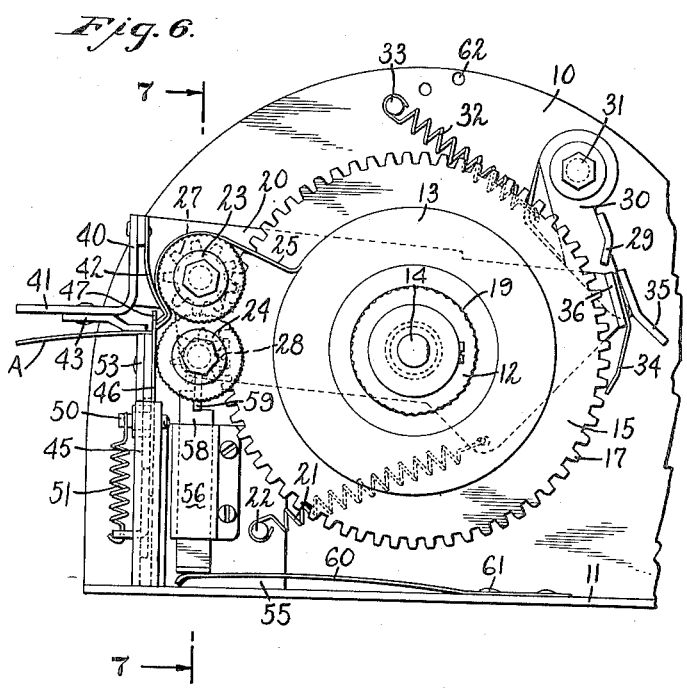
Fig. 6 is a view similar to Fig. 5 but showing the parts in the position occupied by them at the end of a severing operation.

At the front end of the frame 10 is a channel-shaped guide member 45, and to this member is secured an upstanding knife or severing member 46, the free end of which may be slightly inclined and serrated, as shown at 47 in Fig. 2. A guard member 48 is slidably carried in the channel-shaped guide member 45, this guard member being provided with a slot 49 within which is received a pin 50, which pin is secured to the member 45. One end of a spring 51 is secured to this pin and the other end is secured to a lug 52 at the lower end of the guard member 48 so as to maintain this member in its upper position shown, for example, in Figs. 1 and 2. It will be understood, however, that the guard member 48 may be pressed downwardly against the tension of the spring 51. Secured at the upper end of the guard member 48 is a plate 53 so as to give this member a wider supporting surface at its upper end to support a severed end of the tape, as shown in Fig. 6.

The member 45 is secured to the frame member 10 by means of an L-shaped bracket 55, and to the face of this bracket is secured a guide member 56 which together with the bracket 55 forms a guideway 57 for a sliding detent or pawl member 58 having a laterally projecting tooth 59 at its upper end. The pawl member 58 is urged upwardly to the position shown in Fig. 1 by a spring 60 secured to the base member 11 at 61 and having its other end engaging the lower surface of the pawl member 58. It will be apparent that as the lever 20 is moved forwardly and downwardly, the teeth of the pinion 28 will be engaged by the finger or tooth 59, and the pinion and stripper roll 24 to which the pinion is secured will be thereby prevented from rotation. This will occur during a severing operation as will be hereinafter explained.

The normal position of the parts is shown in Fig. 1 where, as will be seen, the pin 33 will limit the movement of the lever 20 in a clockwise direction. If desired, a number of openings 62 may be provided in the frame member 10 in which the pin may be inserted to variously limit the movement of the lever 20 in this direction so as to vary the length of tape dispensed by the machine.

With the parts in the position shown in Fig. 1 the operator presses downwardly on the extending portion 41 of the lever 20 and moves the lever to the position shown in Fig. 5. During this movement of the lever the gear 15 is held against movement by the pawl 29 and the feed roll and stripper roll are caused to rotate by reason of engagement of the teeth of the pinions 27 and 28 with those of the gear 15 which is stationary during this time. When the lever 20 reaches the position shown in Fig. 5 the laterally extending lug 36 engages the tail portion 35 of the pawl 30 and raises the tooth 29 of the pawl from engagement with the teeth of the fulcrum gear 15, as shown in Fig. 5. Thereafter the gear 15 will be free to rotate about the spindle 14, and the rotation of the feed roll and stripper roll will then cease.

The feeding operation has now been completed and a free end of the tape will extend from the machine, as shown at A in Fig. 5. Further movement of the lever 20 downwardly or in a counter-clockwise direction will cause the stripper roll and feed roll to move bodily with the gear 15, but these rolls will no longer rotate. Upon a further downward movement of the lever 20 the member 43 will engage the upper surface of the guard member 48 and cause this member to be depressed from the position shown in Fig. 5 to that shown in Fig. 6. At the same time the finger 59 at the upper end of the detent 58 will be engaged by the teeth of the pinion 28. This will positively prevent any rotation of the stripper and feed rolls during the severing operation and will also depress the detent 58 to the position shown in Fig. 6 against the tension of the spring 60.

When the lever 20 has been brought to the position shown in Fig. 6 it will be seen that the guard member 48 has been carried downwardly beyond the upper severing edge of the severing member 46 and the tape will have been severed while its upper surface is being held against the spaced edges of the members 42 and 43, and its lower surface against the guard member 43 so that the tape will be well supported against movement during the severing operation. The lever 20 will then be released and will be moved in a clockwise direction by the spring 21. The guard member 48 will be moved upwardly to its normal position shown in Fig. 1 and Fig. 5, and will carry with it the severed end of the tape A as shown in Fig. 1, which it strips from the severing member, the rear end of the tape being adhered to the upper surface of the guard member so it will be conveniently presented to the operator in a position for the operator to grasp and apply it to a package or the like.

Also during the rearward or clockwise movement of the lever 20 the spring pawl member 34 will engage the teeth of the fulcrum gear 15 and rotate this gear in a clockwise direction along with the lever 20. This will prevent rearward rotation of the feed roll 23 during this return movement of the lever 20 as it would, of course, be objectionable to permit reverse rotation of the feed roll. The parts are now in a position for a subsequent operation.

While I have shown and described a preferred embodiment of my invention, it will be understood that it is not to be limited to all of the details shown, but is capable of modification and variation within the spirit of the invention and within the scope of the claims.

What I claim is:

1. A mechanism for dispensing pressure-sensitive tape from a supply roll comprising a frame, a severing member carried by the frame, a rotatable tape-feeding member to the surface of which the tape adheres, means for rotating said member to effect forward feeding of the tape, comprising a gear rotatably mounted on the frame, a pinion connected to the feeding member and meshing with said gear, the severing member being fixed on the frame, means for effecting relative movement of said gear and pinion to rotate the latter and the feeding member, and means for thereafter moving said gear and pinion as a unit to advance the tape against the severing member.

2. A mechanism for dispensing pressure-sensitive tape from a supply roll comprising a frame, a severing member carried by the frame, a rotatable tape-feeding member to the surface of which the tape adheres, means for rotating said member to effect forward feeding of the tape, said severing member being fixed on the frame, and means for moving said feeding member and the tape adhering thereto toward the severing member to sever the tape while holding the feeding member against rotation.

3. A device for dispensing pressure-sensitive tape comprising tape-feeding means including a movable tape-advancing member to which the tape adheres, movable striping means to strip the tape from said member, severing means, and means to move said member and stripping means to feed a length of tape and strip it from said member, and means to thereafter effect relative movement between said severing means and said tape-advancing member without feeding additional tape to effect severance of the stripped portion.

4. A mechanism for dispensing pressure-sensitive tape from a supply roll comprising a frame, a severing member carried by the frame, a rotatable tape-feeding member to the surface of which the tape adheres, means for rotating said member to effect forward feeding of the tape, means for effecting relative movement of said severing means and said feeding member with the tape adhering thereto while holding the feeding member against rotation to sever the dipensed portion of the tape, and means for clamping said tape adjacent the severing means during the severing operation.

5. A mechanism for dispensing pressure-sensitive tape from a supply roll comprising a frame, a severing member carried by the frame, a rotatable tape-feeding member to the surface of which the tape adheres, means for rotating said member to effect forward feeding of the tape, means for effecting relative movement of said severing means and said feeding member with the tape adhering thereto while holding the feeding member against rotation to sever the dispensed portion of the tape, and clamping members engaging opposite faces of the tape during the severing operation.

6. A mechanism for dispensing pressure-sensitive tape from a supply roll comprising a frame, a severing member carried by the frame, a rotatable tape-feeding member to the surface of which the tape adheres, means for rotating said member to effect forward feeding of the tape, means for effecting relative movement of said severing means and said feeding member with the tape adhering thereto while holding the feeding member against rotation to sever the dispensed portion of the tape, and clamping members engaging opposite faces of the tape during the severing operation, one of said members serving as a guard for the severing member.

7. A mechanism for dispensing pressure-sensitive tape from a supply roll comprising a frame, a severing member carried by the frame, a rotatable tape-feeding member to the surface of which the tape adheres, means for rotating said member to effect forward feeding of the tape, means for effecting relative movement of said severing means and said feeding member with the tape adhering thereto while holding the feeding member against rotation to sever the dispensed portion of the tape, spaced tape-engaging members to engage one surface of the tape on both sides of said severing member, and an additional member to engage the other face of the tape opposite one of said tape-engaging members to clamp the tape therebetween.

8. A mechanism for dispensing pressure-sensitive tape from a supply roll comprising a frame, a severing member carried by the frame, a rotatable tape-feeding member to the surface of which the tape adheres, means for rotating said member to effect forward feeding of the tape, said severing member being fixed to the frame, means for advancing said feeding member and effecting rotation thereof to draw the tape from the supply roll, and means for thereafter advancing said feeding member toward the severing member to sever the tape while holding the feeding member against rotation.

9. A mechanism for dispensing pressure-sensitive tape from a supply roll, said mechanism comprising a frame, a severing member mounted thereon, a fulcrum gear rotatably mounted on the frame, a lever member pivoted to the axis of said gear, a tape-feeding roll rotatably mounted on said lever to which the free end of the tape adheres, a pinion connected to said roll and meshing with said gear, means for advancing said lever while holding the gear against rotation to rotate the feeding roll and draw tape from the supply roll, and means for thereafter advancing said feeding lever and gear as a unit to carry the tape against the severing member without effecting rotation of the feeding roll.

10. A mechanism for dispensing pressure-sensitive tape from a supply roll, said mechanism comprising a frame, a severing member mounted thereon, a fulcrum gear rotatably mounted on the frame, a lever member pivoted to the axis of said gear, a tape-feeding roll rotatably mounted on said lever to which the free end of the tape adheres, a pinion connected to said roll and meshing with said gear, means for advancing said lever while holding the gear against rotation to rotate the feeding roll and draw tape from the supply roll, and means for thereafter advancing said feeding lever and gear as a unit to carry the tape against the severing member while holding the feeding roller against rotation.

11. A mechanism for dispensing pressure-sensitive tape from a supply roll, said mechanism comprising a frame, a severing member mounted thereon, a fulcrum gear rotatably mounted on the frame, a lever member pivoted to the axis of said gear, a tape-feeding roll rotatably mounted on said lever to which the free end of the tape adheres, a pinion connected to said roll and meshing with said gear, means for holding said gear against rotation in a forward direction to effect rotation of the feeding roller during an initial advance of said lever to draw tape from the supply roll, and means actuated by said lever to release said holding means and permit said gear to rotate during a continued advance of the lever to move the tape against the severing member without effecting rotation of the feeding roller.

12. A mechanism for dispensing pressure-sensitive tape from a supply roll, said mechanism comprising a frame, a severing member mounted thereon, a fulcrum gear rotatably mounted on the frame, a lever member pivoted to the axis of said gear, a tape-feeding roll rotatably mounted on said lever to which the free end of the tape adheres, a pinion connected to said roll and meshing with said gear, means for holding said gear against rotation in a forward direction to effect rotation of the feeding roller during an initial advance of said lever to draw tape from the supply roll, means actuated by said lever to release said holding means and permit said gear to rotate during a continued advance of the lever to move the tape against the severing member, and means for holding said feeding roller against rotation during said continued advance of the lever.

13. A mechanism for dispensing pressure-sensitive tape from a supply roll, said mechanism comprising a frame, a severing member mounted thereon, a fulcrum gear rotatably mounted on the frame, a lever member pivoted to the axis of said gear, a tape-feeding roll rotatably mounted on said lever to which the free end of the tape adheres, a pinion connected to said roll and meshing with said gear, means for advancing said lever and holding said gear against rotation in a forward direction to effect rotation of the feeding roller to draw tape from the supply roll, and means on said lever to engage said holding means after a predetermined advance of the lever to release said holding means and permit said gear to rotate during a continued advance of the lever to move the tape against the severing member.

14. A mechanism for dispensing pressure-sensitive tape from a supply roll, said mechanism comprising a frame, a severing member mounted thereon, a fulcrum gear rotatably mounted on the frame, a lever member pivoted to the axis of said gear, a tape-feeding roll rotatably mounted on said lever to which the free end of the tape adheres, a pinion connected to said roll and meshing with said gear, means for advancing said lever and holding said gear against rotation in a forward direction to effect rotation of the feeding roller to draw tape from the supply roll, means on said lever to engage said holding means after a predetermined advance of the lever to release said holding means and permit said gear to rotate during a continued advance of the lever to move the tape against the severing member, a spring to return said lever to its initial position, and means on said lever to effect rotation of the gear in a reverse direction during said return movement of the lever.

15. A mechanism for dispensing pressure-sensitive tape from a supply roll, said mechanism comprising a frame, a severing member mounted thereon, a fulcrum gear rotatably mounted on the frame, a lever member pivoted to the axis of said gear, a tape-feeding roll rotatably mounted on said lever to which the free end of the tape adheres, a pinion connected to said roll and meshing with said gear, means for advancing said lever while holding the gear against rotation to rotate the feeding roll and draw tape from the supply roll, means for thereafter advancing said feeding lever and gear as a unit to carry the tape against the severing member without effecting rotation of the feeding roll, and stripper means carried by said lever to strip the tape from the feeding roll.

16. A mechanism for dispensing pressure-sensitive tape from a supply roll, said mechanism comprising a frame, a severing member mounted thereon, a fulcrum gear rotatably mounted on the frame, a lever member pivoted to the axis of said gear, a tape-feeding roll rotatably mounted on said lever to which the free end of the tape adheres, a pinion connected to said roll and meshing with said gear, means for advancing said lever while holding the gear against rotation to rotate the feeding roll and draw tape from the supply roll, means for thereafter advancing said feeding lever and gear as a unit to carry the tape against the severing member without effecting rotation of the feeding roll, stripper means carried by said lever to strip the tape from the feeding roll, said stripper means comprising a stripping roller rotatably mounted on the lever, and a pinion secured to said roller and meshing with said fulcrum gear.

17. A mechanism for dispensing pressure-sensitive tape from a supply roll, said mechanism comprising a frame, a severing member mounted thereon, a fulcrum gear rotatably mounted on the frame, a lever member pivoted to the axis of said gear, a tape-feeding roll rotatably mounted on said lever to which the free end of the tape adheres, a pinion connected to said roll and meshing with said gear, means for advancing said lever while holding the gear against rotation to rotate the feeding roll and draw tape from the supply roll, means for thereafter advancing said feeding lever and gear as a unit to carry the tape against the severing member without effecting rotation of the feeding roll, stripper means carried by said lever to strip the tape from the feeding roll, said stripper means comprising a stripping roller rotatably mounted on the lever, a pinion secured to said roller and meshing with said fulcrum gear, and a detent mounted on the frame and engaging the pinion of said stripper roller at a predetermined point in the advance of said lever to prevent rotation thereof.

18. A mechanism for dispensing pressure-sensitive tape from a supply roll, said mechanism comprising a frame, a severing member mounted thereon, a fulcrum gear rotatably mounted on the frame, a lever member pivoted to the axis of said gear, a tape-feeding roll rotatably mounted on said lever to which the free end of the tape adheres, a pinion connected to said roll and meshing with said gear, means for advancing said lever while holding the gear against rotation to rotate the feeding roll and draw tape from the supply roll, means for thereafter advancing said feeding lever and gear as a unit to carry the tape against the severing member without effecting rotation of the feeding roll, stripper means carried by said lever to strip the tape from the feeding roll, said stripper means comprising a stripping roller rotatably mounted on the lever, a pinion secured to said roller and meshing with said fulcrum gear, a detent mounted on the frame and engaging the pinion of said stripper roller at a predetermined point in the advance of said lever to prevent rotation thereof, and said detent being movably mounted on the frame to move with said lever during movement of the tape against the severing member.

References Cited in the file of this patent
UNITED STATES PATENTS

| Number | Name | Date |
|---|---|---|
| Re. 22,981 | Fitch | Mar. 9, 1948 |
| 2,188,473 | Diskerman | Jan. 30, 1940 |
| 2,290,223 | Black et al. | July 21, 1942 |
| 2,342,049 | Holmbeck | Feb. 15, 1944 |
| 2,573,911 | Kreuger | Nov. 6, 1951 |